(12) United States Patent
Han

(10) Patent No.: US 11,755,892 B2
(45) Date of Patent: Sep. 12, 2023

(54) MULTI-SIZE CONVOLUTIONAL LAYER

(71) Applicant: ALIBABA GROUP HOLDING LIMITED, Grand Cayman (KY)

(72) Inventor: Liang Han, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 814 days.

(21) Appl. No.: 16/677,462

(22) Filed: Nov. 7, 2019

(65) Prior Publication Data
US 2021/0142144 A1    May 13, 2021

(51) Int. Cl.
| | | |
|---|---|---|
| *G06N 3/063* | (2023.01) | |
| *G06N 3/04* | (2023.01) | |
| *G06N 3/084* | (2023.01) | |
| *G06F 18/213* | (2023.01) | |

(52) U.S. Cl.
CPC ........... *G06N 3/063* (2013.01); *G06F 18/213* (2023.01); *G06N 3/04* (2013.01); *G06N 3/084* (2013.01)

(58) Field of Classification Search
CPC .......... G06N 3/04; G06N 3/084; G06N 3/063; G06N 3/0454; G06K 9/6232
See application file for complete search history.

(56) References Cited

U.S. PATENT DOCUMENTS

2019/0258917 A1 * 8/2019 Chai .................... G06N 3/084

OTHER PUBLICATIONS

Durall et al. Stabilizing GANs with Soft Octave Convolutions. arXiv preprint arXiv:1905.12534. May 29, 2019 (Year: 2019).*
Fan et al. Accurate retinal vessel segmentation via octave convolution neural network. arXiv preprint arXiv:1906.12193. Jun. 28, 2019 (Year: 2019).*
Durall et al. Stabilizing GANs with Octave Convolutions. arXivpreprintarXiv:1905.12534v1 May 29, 2019 (Year: 2019).*
Chen et al., "Drop an Octave: Reducing Spatial Redundancy in Convolutional Neural Networks with Octave Convolution," https://arxiv.org/abs/1904.05049, 12 pages (2019).

* cited by examiner

*Primary Examiner* — Boubacar Abdou Tchoussou
(74) *Attorney, Agent, or Firm* — Finnegan, Henderson, Farabow, Garrett & Dunner, LLP

(57) ABSTRACT

Improved convolutional layers for neural networks can obtain an input feature map comprising groups of channels. Each group of channels can include one or more channels having a predetermined size. The predetermined sizes can differ between the groups. The convolutional layer can generate, for each one of the groups of channels, an output channel. Generation of the output channel can include resizing the channels in the remaining groups of channels to match the predetermined size of the each one of the groups of channels. Generation can further include combining the channels in the each one of the groups with the resized channels and applying the combined channels to a convolutional sub-layer to generate the output channel.

21 Claims, 5 Drawing Sheets

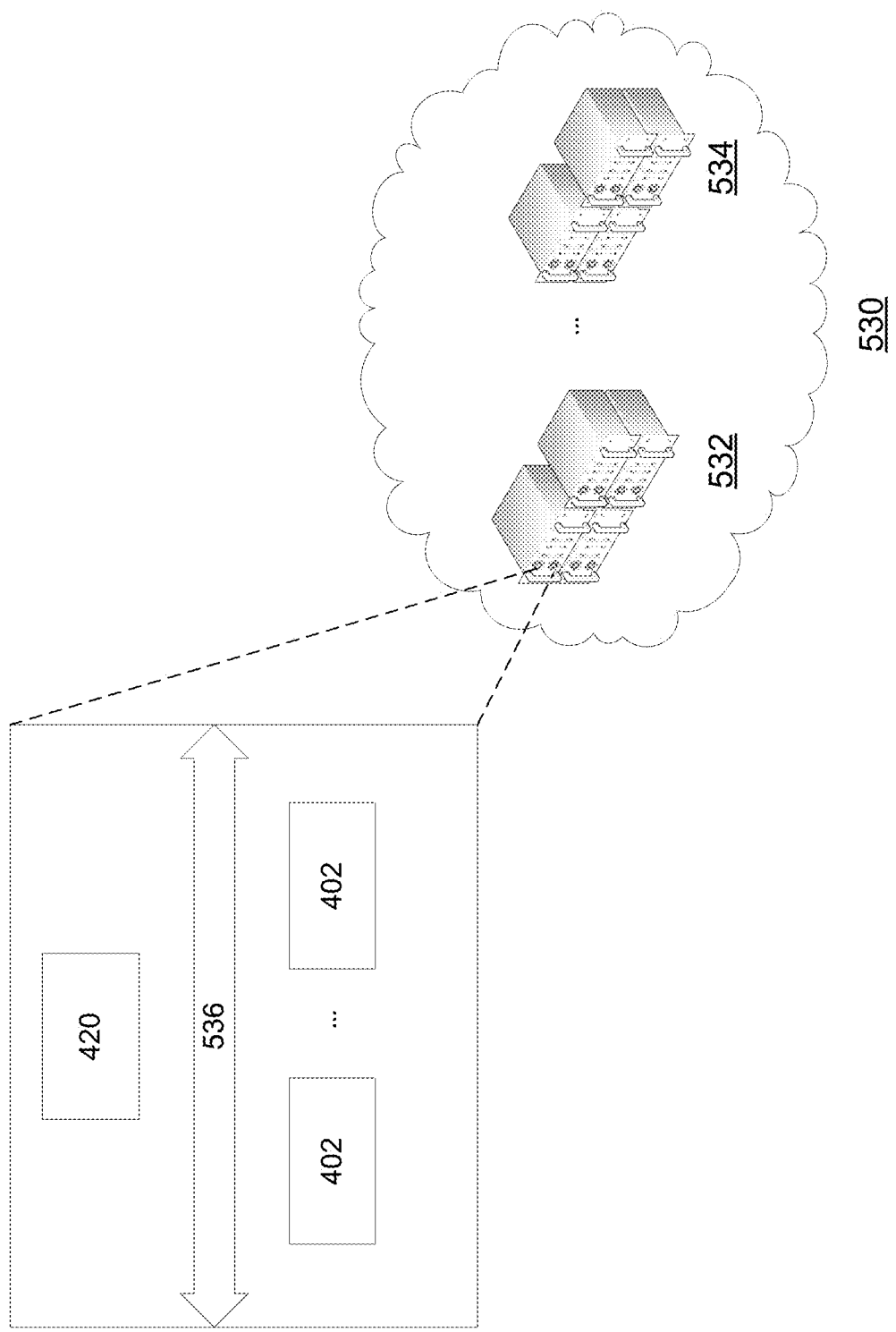

MULTI-SIZE CONVOLUTIONAL LAYER

BACKGROUND

Convolutional neural networks can be used for a variety of applications, including machine vision and natural language processing. Such convolutional neural networks can generate outputs by inputting feature data to convolutional layers (and optionally other types of layers) to generate output feature data. A convolutional layer can generate output feature data by convolving one or more kernels with the input feature data.

Hardware accelerators can be used when implementing neural networks, including convolutional neural networks. Such hardware accelerators offer performance benefits when used with suitable convolutional layers. Whether a convolutional layer is suitable for use with a hardware accelerator can depend on the design of the convolutional layer. The performance of a convolutional neural network can also depend on the computational and storage requirements of the convolutional layer, which can depend on the design of the convolutional layer. Accordingly, conventional convolutional neural networks may not be as suitable for hardware components.

SUMMARY

The disclosed systems and methods include convolutional neural networks including at least one convolutional layer. The convolutional layer can be configured to obtain input feature maps including groups of channels. Each group can include channels of a predetermined size. The predetermined sizes can differ. The convolutional layer can resize the groups to create inputs of each of the predetermined sizes, then provide the inputs to convolutional sub-layers to create groups of output channels. Each group of output channels can include output channels of one of the predetermined sizes. The convolutional layer can combine the output channels to create an output feature map. In some aspects, in creating the output feature map, the convolutional layer can apply an activation function to the combined output channels.

The disclosed embodiments include a processing unit. The processing unit can include one or more cores configured by a task manager to generate a neural network output from a neural network input. The generation of the neural network output can include generating an output feature map including a first output channel and a second output channel using an input feature map including a first input channel and a second input channel. The generation of the output feature map can include generating, by up-sampling the first input channel, a third input channel; and generating, by down-sampling the second input channel, a fourth input channel. The generation of the output feature map can further include convolving a first input including the third input channel and the second input channel with a first kernel to generate the first output channel. The generation of the output feature map can also include convolving a second input including the fourth input channel and the first input channel with a second kernel to generate the second output channel.

The disclosed embodiments include another processing unit. This other processing unit can include one or more cores configured by a task manager to generate a neural network output from a neural network input. The generation of the neural network output can include generating an output feature map including a first output channel of a first size and a second output channel of a second size using an input feature map including a first input channel of the first size and a second input channel of the second size, the first size smaller than the second size. The generation of the output feature map can include generating, using the first input channel, a third input channel of the second size; and generating, using the second input channel, a fourth input channel of the first size. The generation of the output feature map can further include generating the first output channel by providing a first input including the third input channel and the second input channel to a first convolutional sub-layer. The generation of the output feature map can also include generating the second output channel by providing a second input including the first input channel and the fourth input channel to a second convolutional sub-layer.

The disclosed embodiments include a non-transitory computer-readable medium. The computer-readable medium can store a set of instructions. The instructions can be executable by one or more processors of a system to cause the system to perform operations. The operations can include obtaining an input feature map including groups of channels, each group of channels including one or more channels having a predetermined size, the predetermined sizes differing between the groups. The operations can further include generating, for each one of the groups of channels, an output channel. The generation of the output channels can include resizing the channels in the remaining groups of channels to match the predetermined size of the each one of the groups of channels. The generation of the output channels can further include combining the channels in the each one of the groups with the resized channels. The generation of the output channels can also include applying the combined channels to a convolutional sub-layer to generate the output channel.

The disclosed embodiments include a method for generating output channels using a convolutional layer of a convolutional neural network. The method can include operations. An operation can include obtaining an input feature map including groups of channels, each group of channels including one or more channels having a predetermined size, the predetermined sizes differing between the groups. An additional operation can include generating, for each one of the groups of channels, an output channel. Generation of the output channel can include resizing the channels in the remaining groups of channels to match the predetermined size of the each one of the groups of channels. Generation of the output channel can further include combining the channels in the each one of the groups with the resized channels. Generation of the output channel can also include applying the combined channels to a convolutional sub-layer to generate the output channel.

The disclosed embodiments include a method for generating an output feature map including a first output channel and a second output channel from an input feature map including a first input channel and a second input channel, using a convolutional layer of a convolutional neural network. The method can include operations. An operation can include generating, by up-sampling the first input channel, a third input channel. An additional operation can include generating, by down-sampling the second input channel, a fourth input channel. A further operations can include convolving a first input including the third input channel and the second input channel with a first kernel to generate the first output channel. Another operation can include convolving a second input including the fourth input channel and the first input channel with a second kernel to generate the second output channel.

The disclosed embodiments include a method for generating an output feature map including a first output channel of a first size and a second output channel of a second size from an input feature map including a first input channel of the first size and a second input channel of the second size, the first size smaller than the second size, using a convolutional layer of a convolutional neural network. The method can include operations. An operation can include generating, using the first input channel, a third input channel of the second size. An additional operation can include generating, using the second input channel, a fourth input channel of the first size. A further operation can include generating the first output channel by providing a first input including the third input channel and the second input channel to a first convolutional sub-layer. Another operation can include generating the second output channel by providing a second input including the first input channel and the fourth input channel to a second convolutional sub-layer.

The disclosed embodiments include a device. The device can include a host unit and a neural processing unit configurable by the host unit. The neural processing unit can be configurable to generate a neural network output from a neural network input. The generation of the neural network output can include generating an output feature map including a first output channel and a second output channel using an input feature map including a first input channel and a second input channel. The generation of the output feature map can include generating, by up-sampling the first input channel, a third input channel; and generating, by down-sampling the second input channel, a fourth input channel. The generation of the output feature map can further include convolving a first input including the third input channel and the second input channel with a first kernel to generate the first output channel. The generation of the output feature map can also include convolving a second input including the fourth input channel and the first input channel with a second kernel to generate the second output channel.

The disclosed embodiments include another device. The device can include a host unit and a neural processing unit configurable by the host unit. The neural processing unit can be configurable to generate a neural network output from a neural network input. The generation of the neural network output can include generating an output feature map including a first output channel of a first size and a second output channel of a second size using an input feature map including a first input channel of the first size and a second input channel of the second size, the first size smaller than the second size. The generation of the output feature map can include generating, using the first input channel, a third input channel of the second size; and generating, using the second input channel, a fourth input channel of the first size. The generation of the output feature map can further include generating the first output channel by providing a first input including the third input channel and the second input channel to a first convolutional sub-layer. The generation of the output feature map can also include generating the second output channel by providing a second input including the first input channel and the fourth input channel to a second convolutional sub-layer.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIG. 5 illustrates a schematic diagram of an exemplary cloud system incorporating a neural network processing architecture, in accordance with some embodiments of the present disclosure.

DETAILED DESCRIPTION

Figure 1:
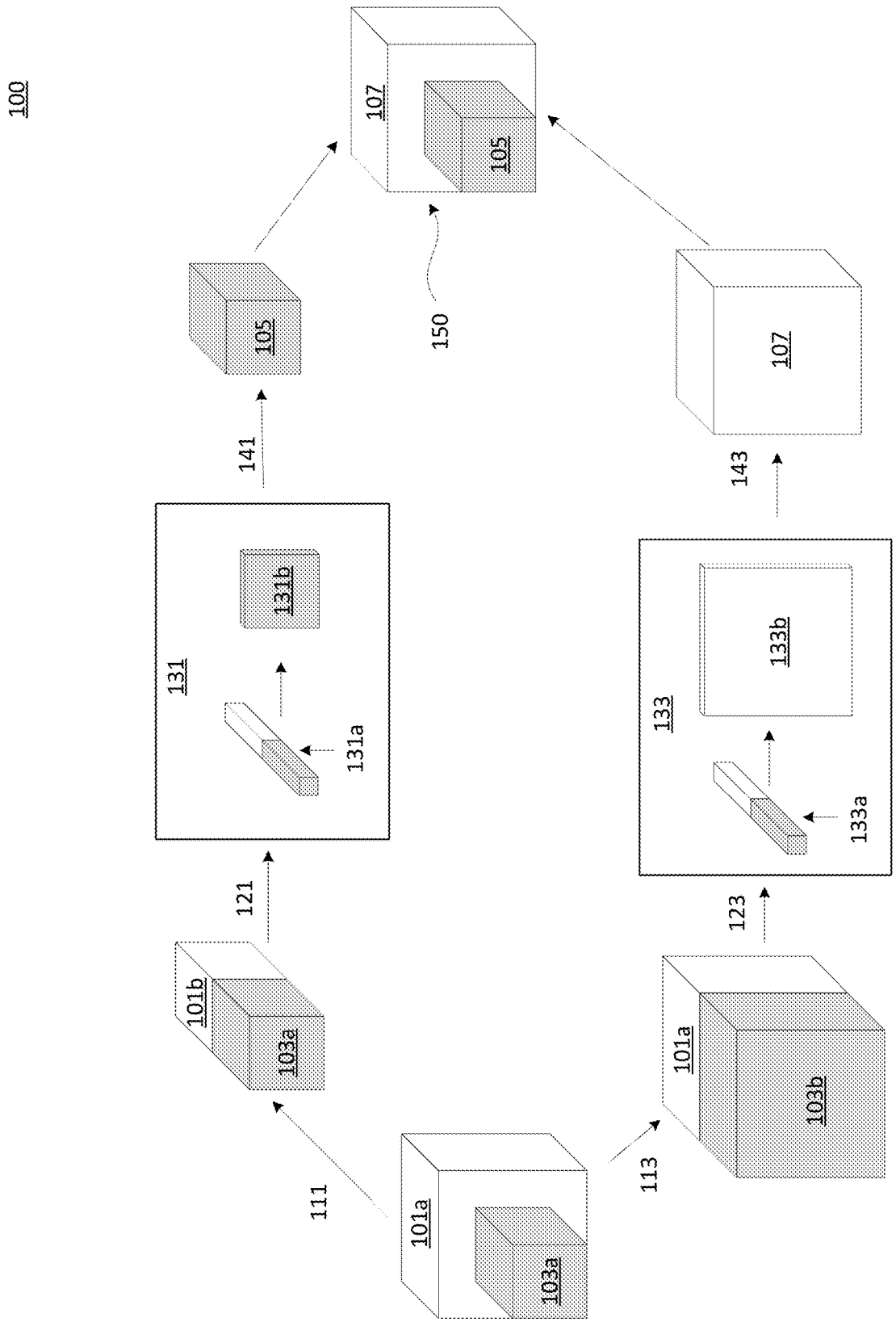
FIG. 1 depicts the exemplary operation of an unconventional convolutional layer, in accordance with some embodiments of the present disclosure.

Reference will now be made in detail to exemplary embodiments, discussed with regards to the accompanying drawings. In some instances, the same reference numbers will be used throughout the drawings and the following description to refer to the same or like parts. Unless otherwise defined, technical or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Convolutional neural networks, which can be used for applications including machine vision and natural language processing, can generate outputs by inputting feature data to convolutional layers (and optionally other types of layers) to generate output feature data. A convolutional layer can generate output feature data by convolving one or more kernels with the input feature data.

Reducing the size of the input feature data can improve the efficiency of a convolutional layer. For example, in octave convolution, as described in "Drop an Octave: Reducing Spatial Redundancy in Convolutional Neural Networks with Octave Convolution," the input feature data includes two feature maps at different spatial frequencies. The low frequency feature map can be smaller than the high frequency feature map, potentially reducing the computational and storage requirements of octave convolution as compared to conventional convolution. Furthermore, by causing the output features to depend on both high and low spatial frequency features, octave convolution effectively enlarges the receptive field of each output feature, potentially improving the performance of convolutional neural networks including octave convolution layers.

Octave convolution requires additional operations, however, as compared to regular convolution. An octave convolution layer may require two separate convolution operations to generate each output channel of a feature map. In one convolution, the low frequency feature map can be convolved with a low frequency kernel to generate a low frequency output. In another convolution, the high frequency feature map can be convolved with a high frequency kernel to generate a high frequency output. The low frequency output or high frequency output can then be up-sampled or down-sampled to match the high frequency output or low frequency output, respectively. The two outputs, now of matching sizes, can be added together to create the output channel. To create the output feature map, these operations can be repeated using a different kernel for each output channel.

The additional operations required by octave convolution can reduce computational efficiency and increased data movement requirements. These additional operations may particularly inhibit performance when using dedicated hardware accelerators with coarse operation granularity. As a result, using octave convolution layers on such accelerators may increase computational requirements and extend execution time, as compared to using traditional convolution layers. According, implementing convolution layers with reduced-size input feature maps using dedicated hardware accelerators presents a technical problem.

The disclosed embodiments address this technical problem using an unconventional convolution layer. This unconventional convolution layer can be configured to receive an input feature map including channels of differing sizes, resize the channels, and then convolve the channels to generate an output feature map. In some instances, for example, the convolutional layer can receive channels of differing sizes, create a full set of the channels for each size, convolve each full set of the channels with a corresponding kernel to generate an output layer, and combine the output layers to form the output feature map. Resizing the channels prior to convolution can reduce the number of resizing operations performed. For example, rather than resizing convolution operation outputs individually, multiple input channels can be resized together. In some embodiments, an output channel can be generated using a single convolution operation, rather than two convolutions. In various embodiments, an output channel can be created without requiring the addition of convolution outputs of differing sizes, as in octave convolution. Accordingly, the disclosed embodiments are suitable for use with dedicated convolution accelerators having coarse operation granularity. The disclosed embodiments therefore enable such architectures to realize the identified benefits of convolution layers using reduced-size input feature maps, thereby improving the computational efficiency, storage requirements, and precision of convolutional neural networks.

FIG. 1 depicts the exemplary operation of an unconventional convolutional layer 100, consistent with some embodiments of the present disclosure. Convolutional layer 100 can be part of a convolutional neural network configured to generate a convolutional neural network output (e.g., a label, a modified image, a caption, or the like) from a convolutional neural network input (e.g., image data, word embeddings, or the like). Generation of the neural network output can involve processing the convolutional neural network input data through successive processing layers, including convolutional layer 100. Such layers can generate output feature maps using input feature maps. In the example shown in FIG. 1, the input feature map includes a group of high-frequency input channels 101a and a group of low frequency input channels 103a. The output feature map can include a group of low-frequency output channels 105 and a group of high-frequency output channels 107. In this exemplary embodiment, by resizing the input channels prior to convolving the input channels with the kernels (e.g., kernels 131a and 133a), convolutional layer 100 can generate output channels in a single convolution and without requiring the re-sizing and addition of convolution outputs.

The input feature map can include groups of channels. Though depicted in FIG. 1 as including two channels (e.g., input group 101a and input group 103a), the input feature map can include more than two groups of channels. For example, the input feature map can include between two and thirty-two groups of channels (e.g. 2, 4, 8, 16, or 32 groups of channels), or more than thirty-two groups of channels. Each group of channels can include one or more channels. The depth of a group of channels can be the number of channels in the group. The depth of an input feature map can be the number of channels in the input feature map.

Each input channel can have a size. The size can be the number of feature values in the input channel. For example, an input channel of size 256 can include 256 feature values. In some embodiments, the input channels can be structured as arrays having a height and a width. For example, an input channel of size 256 can have a height of 16 and a width of 16. In some embodiments, each channel in a group of channels can have the same size. Each channel in a group of channels may further have the same width and height.

As depicted in FIG. 1, in step 111 convolutional layer 100 can be configured to generate a first input feature map by resizing input group 101a to create input group 101b. As shown, input group 101b can have the same size as input group 103a. For example, input group 101b can have the same width and height as input group 103a. In some aspects, convolutional layer 100 can be configured to down-sample input group 101a to create input group 101b. Such down-sampling may be accomplished using convolution (e.g., convolving each channel in input group 101a with a kernel using a stride greater than one, or the like), pooling (max pooling, average pooling, or the like), sampling (e.g., integer or non-integer sampling, or the like), or another suitable down-sampling method. In some embodiments, input group 101b would then include a down-sampled channel corresponding to each original channel in input group 101a.

Similarly, as depicted in FIG. 1, in step 113 convolutional layer 100 can be configured to generate a second input feature map by resizing input group 103a to create input group 103b. As shown, input group 103b can have the same size as input group 101a. For example, input group 103b can have the same width and height as input group 101a. In some aspects, convolutional layer 100 can be configured to up-sample input group 103a to create input group 103b. Such up-sampling may be accomplished using deconvolution (e.g., a transposed convolution layer or the like), unpooling, interpolation (e.g., linear interpolation or the like), or another suitable up-sampling method. In some embodiments, input group 103b would then include an up-sampled channel corresponding to each original channel in input group 103a.

In step 121, convolutional layer 100 can be configured to convolve a combination of resized input group 101b and input group 103a. The combination can be a concatenation of input group 101b and input group 103a. In some embodiments, this convolution can be performed by a convolutional sub-layer 131. Convolutional sub-layer 131 can be a logical or physical sub-layer. As a non-limiting example of a logical sub-layer, convolutional layer 100 can be configured with data or instructions causing convolutional layer 100 to call a function or service that performs convolution on the combination of input group 101b and input group 103a. As a non-limiting example of a physical sub-layer, convolutional layer 100 can be implemented using a special purpose architecture configured with hardware accelerators for performing convolution. Convolutional layer 100 can be configured to provide the combination of input group 101b and input group 103a to such a hardware accelerator. Convolutional sub-layer 131 can be configured to convolve the combination of input group 101b and input group 103a by one or more kernels to generate one or more output channels. For example, as shown in FIG. 1, convolutional sub-layer 131 can be configured to convolve the combination of input group 101b and input group 103a by kernel 131a to generate output channel 131b. As shown, kernel 131a can include a portion corresponding to input group 103a and a portion corresponding to input group 101b. In some embodiments, the number of kernels can determine the number of output channels created by convolutional sub-layer 131.

Similarly, in step 123, convolutional layer 100 can be configured to convolve a combination of resized input group 103b and input group 101a. The combination can be a concatenation of input group 103b and input group 101a. In some embodiments, this convolution can be performed by a convolutional sub-layer 133 similar to convolutional sub-layer 131, described above. In some embodiments, convolutional sub-layer 133 and convolutional sub-layer 131 can be the same convolutional sub-layer (e.g., constitute two invocations of the same method, use the same hardware accelerator, or the like). Convolutional sub-layer 133 can be configured to convolve the combination of input group 101a and input group 103b by one or more kernels to generate one or more output channels. For example, as shown in FIG. 1, convolutional sub-layer 131 can be configured to convolve the combination of input group 101a and input group 103b by kernel 133a to generate output channel 133b. As shown, kernel 133a can include a portion corresponding to input group 101a and a portion corresponding to input group 103b. In some embodiments, the number of kernels can determine the number of output channels created by convolutional sub-layer 133.

In steps 141 and 143, convolutional layer 100 can be configured to combine the output channels generated by convolutional sub-layers 131 and 133 to create output channel group 105 and output channel group 107, respectively. In some embodiments, convolutional layer 100 can be configured to concatenate the output channels created by convolutional sub-layers 131 and 133 to create output channel group 105 and output channel group 107, respectively. In step 150, in various embodiments, output channel group 105 and output channel group 107 can be combined to form the output feature map. In some instances, convolutional layer 100 can be configured to create or update a data structure to store the output feature map. In some embodiments, the data structure can include output channel group 105 and output channel group 107. In various embodiments, the data structure can include references to data structures including output channel group 105 and output channel group 107, respectively. In some embodiments, the output feature map can be provided to an activation function (e.g., identity function, binary step function, logistic function, tanh function, rectified linear unit function, or other activation function) to create the input feature map for the next layer in the convolutional neural network.

Figure 2:
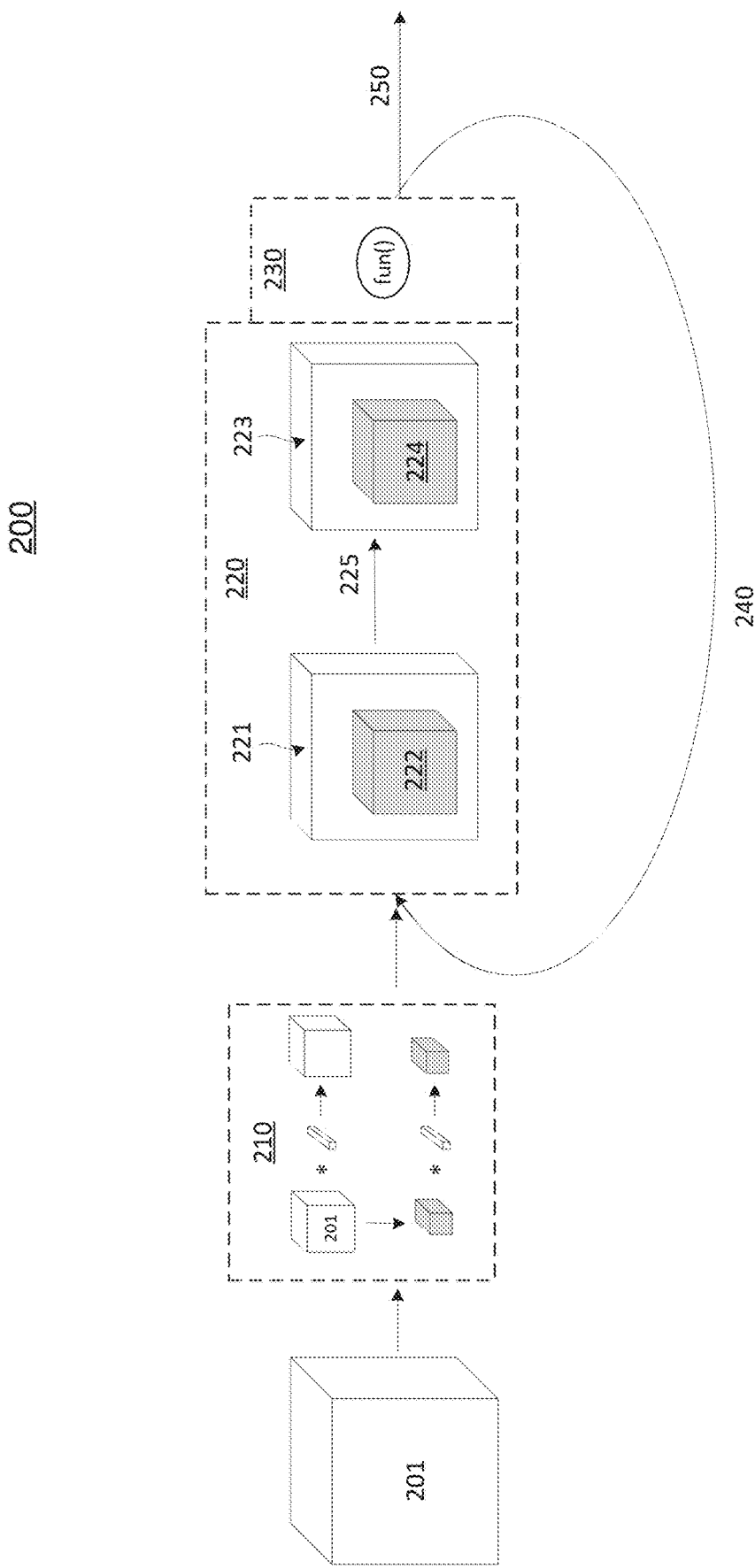
FIG. 2 depicts an exemplary logical diagram of a convolutional neural network configured to use the unconventional convolutional layer of FIG. 1, in accordance with some embodiments of the present disclosure.

FIG. 2 depicts an exemplary logical diagram of a convolutional neural network (CNN 200) configured to use the unconventional convolutional layer described in FIG. 1. As shown in FIG. 2, CNN 200 can be configured to receive an initial feature map 201. In some embodiments, CNN 200 can be implemented using a hardware accelerator. The feedback depicted in FIG. 2 can enable this hardware accelerator to be reused to implement multiple convolutional layers in the neural network.

In step 210, CNN 200 can be configured to generate an input feature map (e.g., including input groups 221 and 222) from initial feature map 201. Initial feature map 201 can comprise feature values received from a sensor or another device (e.g., a camera of a device implementing CNN 200, or a remote camera). The feature values can be intensity values for inputs (e.g. the intensity of light impinging on a pixel in a CMOS or CCD array). For example, when CNN 200 receives sensor data from a digital camera, the initial feature map may include three channels, each corresponding to one of the red, green, and blue channels of the digital camera sensor data.

CNN 200 can be configured to generate the input feature map by providing the initial feature map to a sequence of layers. These layers can include a convolutional layer, and may include additional layers (e.g., an embeddings layer, a fully connected layer, or the like). In some embodiments, CNN 200 can be configured to generate an input feature map having multiple groups of input channels, each of the groups including channels of a different predetermined size. CNN 200 can be configured to generate input maps corresponding to each of the different predetermined sizes. When the initial feature map matches one of the predetermined sizes, CNN 200 can be configured to use the initial feature map as the input feature map corresponding to that size. For example, when there are three predetermined sizes and the initial feature map matches one of the sizes, CNN 200 can be configured to create two additional input maps from the initial feature map, each additional input map matching one of the remaining sizes, resulting in an input map matching each of the predetermined sizes. To continue this example, CNN 200 can be configured to create three additional input maps matching each of the predetermined sizes when the initial feature map does not match any of the predetermined sizes.

CNN 200 can be configured to apply the input maps to convolutional sub-layers (e.g., through repeated calls to a convolution operation, providing of the input maps to one or more hardware accelerators, or the like) to generate output maps. Each convolutional sub-layer can be configured to convolve an input map with one or more kernels to generate one or more output channels of a corresponding predetermined size. For example, the initial feature map may comprise three channels, each channel including 1024 by 1024 elements, and the input feature map may comprise three groups of channels: a first group of three channels, each channel in the first group including 2048 by 2048 elements; a second group of three channels, each channel in the second group including 1024 by 1024 elements; and a third group of three channels, each channel in the third group including 512 by 512 elements. CNN 200 can be configured to up-sample the initial feature map to generate a first input map, use the initial feature map (or a copy thereof) as the second input map, and down-sample the initial feature map to generate the third input map. The first input map can be convolved with three kernels, which may differ, to generate the three output channels of the first output group. The second input map can be convolved with three other kernels, which may also differ, to generate the three output channels of the second output group. The third input map can be convolved with three further kernels, which may also differ, to generate the three output channels of the third output group. The first group of channels, second group of channels, and third group of channels may then be combined and passed through an activation function to generate the input feature map, which can be used by the following layer in CNN 200.

Convolutional layer 220 can be configured to receive an input feature map. This input feature map can be the input feature map created in step 210 or may be the result of further processing of the input feature map created in step 210 (e.g., processing by additional layers). The input feature map can comprise multiple groups of channels. Each group of channels can have a predetermined size. For example, as depicted in FIG. 2, the input feature map can include input group 221 and input group 222. As shown, the size of input group 221 can be larger than the size of input group 222. In step 225, the unconventional method of convolution described above with regards to FIG. 1 can be applied to the input feature map to generate an output feature map. For example, input group 221 and input group 222 can be provided to a high frequency convolutional sub-layer and a low-frequency convolutional sub-layer, which may generate an output feature map including output group 223 and output group 224. As shown, the size of output group 223 can be larger than the size of output group 224.

Activation function 230 can be configured to convert feature values in the output feature map to activation values. The activation function can be, or be a function of, an identity function, binary step function, logistic function, tanh function, rectified linear unit function, or other activation function. In some embodiments, in step 240, the activation values can be used as the inputs to convolutional layer 220. In this manner, the outputs generated by convolutional layer 220 can be repeatedly input to convolutional layer 220. Accordingly, convolutional layer 220 can be configured to provide the functionality of multiple convolutional layers. In some embodiments, in step 250, convolutional layer 220 can be configured to additionally or alternatively output the activation values. The output activation values can be provided to one or more additional layers of CNN 200, or may comprise the output of CNN 200.

In general, while described with regards to a single convolutional layer, it may be appreciated that one or more additional layers may precede the convolutional layer (e.g., an embedding layer, a fully connected layer, or the like). Similarly, one or more additional layers may follow the convolutional layer (e.g. fully connected layer, or the like). Furthermore, one or more additional layers or connections (not shown in FIG. 2) may be interposed between iterations of the convolutional layer (e.g. a pooling or unpooling layer, a batch normalization layer, residual neural network (ResNet) connections, or the like).

Figure 3:
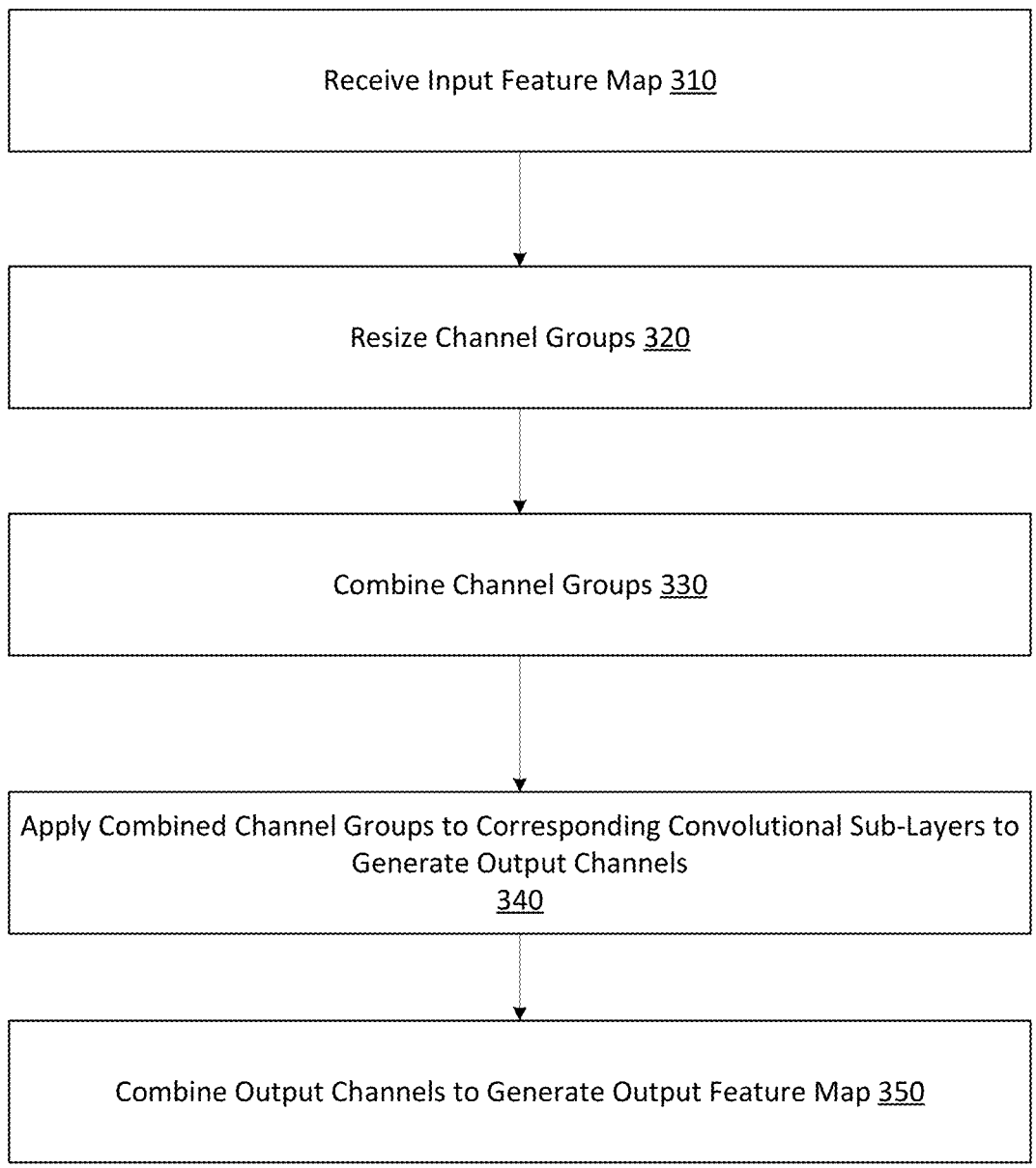
FIG. 3 depicts an exemplary method for generating an output feature map from an input feature map including multiple groups of input channels, in accordance with some embodiments of the present disclosure.

FIG. 3 depicts a method 300 for convolving an input feature map including multiple groups of input channels, in accordance with some embodiments of the present disclosure. Method 300 can include generating inputs to convolutional sub-layers by resizing and combining groups to channel inputs. Method 300 can be performed by a convolution layer, which may be implemented using one or more dedicated convolution accelerators or one or more conventional computing devices. Accordingly, method 300 can support reduced-size input feature maps, thereby improving the computational efficiency, storage requirements, and precision of a convolutional neural network.

In step 310 of method 300, the convolutional layer can obtain an input feature map. In some instances, the convolutional layer can receive the input feature map from another convolutional layer, or the output of the convolutional layer can be returned to the input of the convolutional layer. In various instances, the convolutional layer can generate the input feature map, for example from data received by the input feature map. In various instances, the convolutional layer can retrieve the input feature map from a local or remote computer memory accessible to the convolutional layer.

The input feature map can include groups of channels. Each of the groups of channels can include one or more channels. The one or more channels in a group can have the same size. For example, they can include the same number of features. As an additional example, the one or more channels in a group may have the same dimensions (e.g., the same width and height). The size of the one or more channels in each group may be predetermined. For example, these sizes may be determined prior to training of the convolutional layer. In this manner, both the number of groups, the number of channels in each group, and the predetermined size of the channels in each group may be hyperparameters associated with the convolutional layer. Such hyperparameters may be optimized during generation and training of the convolutional layer using methods such as a grid search, random search, gradient descent method, Bayesian optimization, or the like. In some embodiments, the input feature layer may include between 2 and 32 groups of channels. In various embodiments, the input feature layer may include 2, 4, 8, 16, or 32 groups of channels.

In some embodiments, the sizes for the channels in the groups may form an increasing sequence, with adjacent sizes in the sequence differing by a factor greater than one. As a non-limiting example, when there are three groups, the first group may include channels with 64 features, the second group may include channels with 256 features, and the third group may include channels with 1024 features. In this example, the adjacent sizes in the sequence differ by a factor of four. In another example, adjacent sizes in the sequence can differing by differing factor (e.g., a first group including channels with 16 features, a second group including channels with 256 features, and a third group including channels with 1024 features).

In some embodiments, a dimension for the channels in the groups may form an increasing sequence, with adjacent dimensions in the sequence differing by a factor greater than one. For example, to continue the prior non-limiting example, the first group may include channels with a width of 8, the second group may include channels with a width of 16, and the third group may include channels with a width of 32. In this example, the adjacent widths differ by a factor of two. In this example, the heights similarly differ by a factor of two. Similar to the sizes, as described above, adjacent dimensions in the sequence can differing by differing factors. Furthermore, in various embodiments, the heights and widths may differ between adjacent dimensions in the sequence by differing factors. For example, the heights may differ by a factor of two between adjacent heights in the sequence, while the widths remain unchanged.

In step 320 of method 300, the convolutional layer can resize the groups of channels in the input feature map (e.g., as described above with regards to steps 111 and 113 of FIG. 1). The convolutional layer can be configured to resize the groups of channels such that there exists, for each channel size, either the original group of channels or a resized version of the group of channels. For example, when the input feature map includes groups of channels $A_X$, $B_Y$, and $C_Z$ with sizes X, Y, and Z, respectively, the convolutional layer may be configured to create resized versions $A_Y$ and $A_Z$ of group $A_X$, resized versions $B_X$ and $B_Z$ of group $B_Y$, and resized versions $C_X$ and $C_Y$ of group $C_Z$. In this example, following resizing, there may exist channel groups $A_X$, $B_X$, and $C_X$ of size X; channel groups $A_Y$, $B_Y$, and $C_Y$ of size Y; and channel groups $A_Z$, $B_Z$, and $C_Z$ of size Z. In some embodiments, multiple versions of a group or versions of multiple groups may be created at the same time (e.g., all resizing may occur before any convolution). In various embodiments, a version of a group or versions of multiple groups may be created as used by the convolutional layer (e.g., $B_X$ and $C_X$ are created, then $A_X$, $B_X$, and $C_X$ are convolved with a kernel before creation of $A_Y$ or $C_Y$). The disclosed embodiments are not intended to be limited to a particular order of generating the versions of the groups. As described herein, the resizing can include at least one of convolution, max pooling, averaging pooling, deconvolution, unpooling, or interpolation.

In step 330 of method 300, the convolutional layer can combine channel groups to create inputs for convolution. For example, the convolutional layer can be configured to concatenate channel groups including channels of the same size to create an input for convolution. To continue the above example, the convolutional layer can be configured to concatenate $A_X$, $B_X$, and $C_X$ to create an input $D_X$ having a depth equal to the sum of the depths of $A_X$, $B_X$, and $C_X$ and a height and width equal to the height and width of $A_X$, $B_X$, and $C_X$. Alternatively or additionally, the input can be generated by applying a function to $A_X$, $B_X$, and $C_X$. For example, $D_X$ can be a sum, or weighted sum, of $A_X$, $B_X$, and $C_X$. In some embodiments, multiple inputs may be created at the same time (e.g., inputs $D_X$, $D_Y$, and $D_Z$ may be created before any convolution). In various embodiments, an input may be created as used by the convolutional layer (e.g., input $D_X$ is created and convolved to generate an output channel before creation of input $D_Y$). The disclosed embodiments are not intended to be limited to a particular order of combining the input channels.

In step 340 of method 300, the convolutional layer can apply the combined channel groups (the inputs) to convolutional sub-layers to generate output channels. As described above with regards to FIG. 1, such a convolution sub-layer can be a logical or physical sub-layer. In some embodiments, multiple inputs can be applied at the same time (e.g., all convolution may occur after all inputs are generated). In various embodiments, convolution may occur as inputs are created by the convolutional layer (e.g., input $D_X$ is applied to a sub-layer to generate an output channel before creation of input $D_Y$). The disclosed embodiments are not intended to be limited to a particular order of applying the combined channel groups to the convolutional sub-layers, or a particular order of generating the output channels. As would be appreciated by one of skill in the art, the number of output channels can depend on the number of kernels convolved with each input. In some embodiments, a size of the output channels can depend on the dimensions of the inputs. The size of the output channels can also depend on parameters of the convolution (e.g., stride, padding, and the like).

In step 350 of method 300, the convolutional layer can be configured to combine the output channels to generate an output feature map. The output channels can be combined as described above with regards to FIG. 1. The disclosed embodiments are not intended to be limited to a particular method for combining the output channels to generate an output feature map. In some embodiments, following generation of the output feature map, the output feature map can be applied to an activation function, as described above with regards to FIG. 1, to generate an activation map, which can be provided to another convolutional layer.

Figure 4:
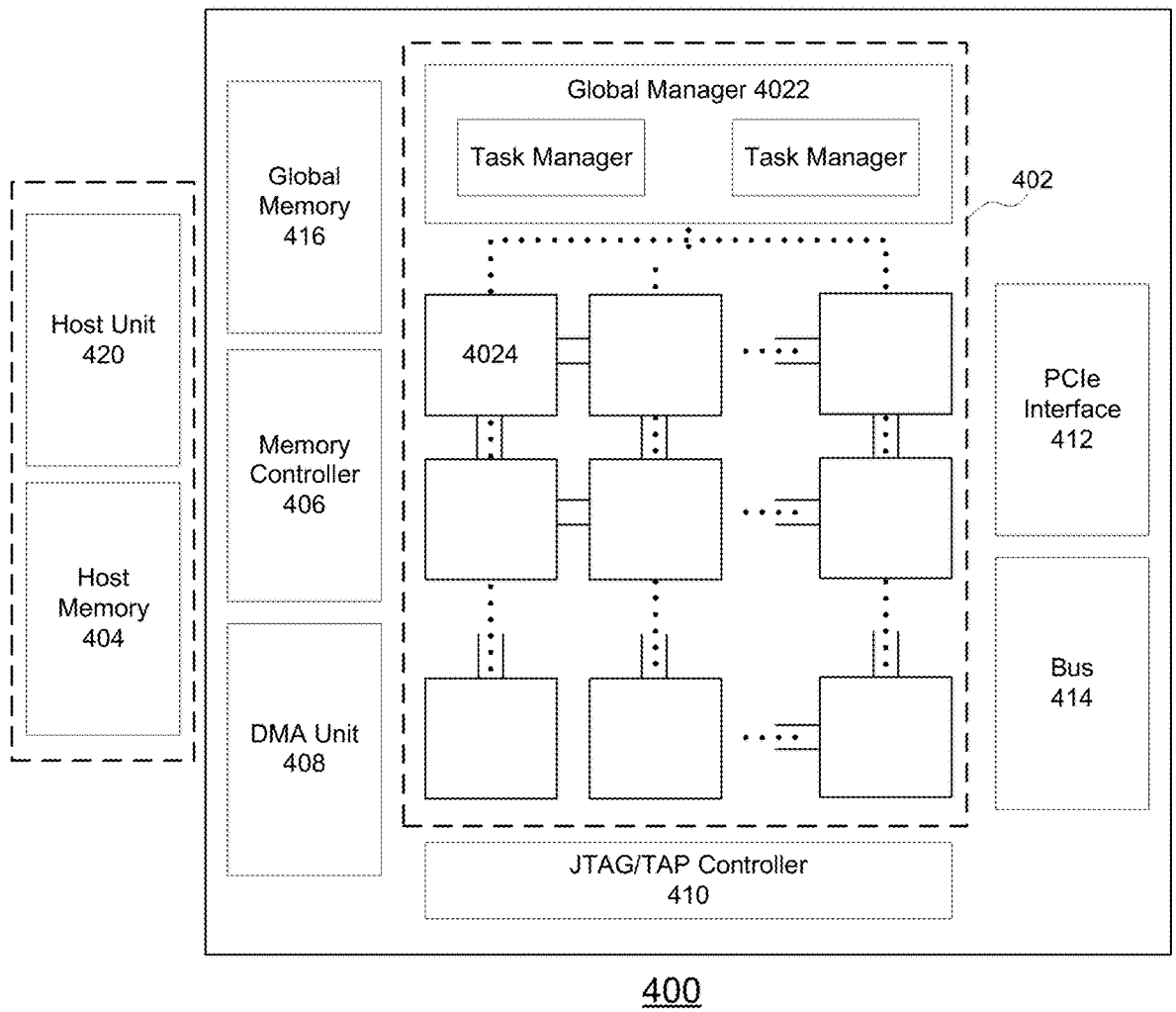
FIG. 4 illustrates an exemplary parallel computing architecture suitable for implementing the convolutional layers of FIGS. 1-3, in accordance with some embodiments of the present disclosure.

FIG. 4 illustrates an exemplary parallel computing architecture 400 suitable for implementing the convolutional layers of FIGS. 1-3, according to embodiments of the disclosure. As shown in FIG. 4, architecture 400 can include a chip communication system 402, a memory controller 406, a direct memory access (DMA) unit 408, a Joint Test Action Group (JTAG)/Test Access End (TAP) controller 410, a peripheral interface 412, an interface 414, a global memory 416, and the like. It is appreciated that chip communication system 402 can perform algorithmic operations (e.g., machine learning operations) based on communicated data. For example, exemplary parallel computing architecture 400 can be configured by instructions (e.g., instructions in a computer program) to implement the convolutional layers of FIGS. 1-3. In some embodiments, the instructions can be stored in one or more non-transitory computer media. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. In various embodiments, the instructions can comprise transitory information, such as signals propagating through a computing device, computer system, or network of computer systems.

Chip communication system 402 can be configured to implement one or more neural networks. Chip communication system 402 can include a global manager 4022 and a plurality of cores 4024. Global manager 4022 can include at least one task manager to coordinate with one or more cores 4024. Each task manager can be associated with an array of cores 4024 that provide synapse/neuron circuitry for parallel computation. For example, a first layer of processing elements of FIG. 4 may provide circuitry representing an input layer to a neural network, while a second layer of cores may provide circuitry representing a hidden layer of the neural network.

In some embodiments, chip communication system 402 can be configured to implement an unconventional convolutional layer (e.g. as described above with regards to FIGS. 1-3). In some embodiments, a user interacting with a host system through a machine learning framework (e.g., TensorFlow, Caffe, PyTorch, CNTK, MXNet, Chainer, Keras, DeepLearning4J, PaddlePaddle, Theano, Shogun, Torch, or the like) can specify that a neural network includes such an unconventional convolutional layer. In some embodiments, the machine learning framework can include a library of machine learning functionality (e.g., CuDNN, Cuda, MKL-DNN, Neon, or the like). In various embodiments, the unconventional convolutional layer can be included in the library.

The host system can be configured to convert the specification of the unconventional convolutional layer into instructions for chip communication system 402, consistent with disclosed embodiments. The host system can provide these instruction to chip communication system 402. Chip communication system 402 can be configured by these instructions to implement the unconventional convolutional layer. As a non-limiting example, one or more of cores 4024 can be configured by a task manager to process combined channel groups into output channels. As an additional non-limiting example, chip communication system 402 can be configured to resize and combine channel groups prior to processing combined channel groups into output channels (e.g., using one or more of cores 4024).

In some embodiments, chip communication system 402 can be implemented as a neural processing unit (NPU), a graphic processing unit (GPU), or another heterogeneous accelerator unit. As shown in FIG. 4, global manager 4022 can include one or more task managers to coordinate with one or more arrays of cores.

Cores 4024, for example, can include one or more processing elements that each include single instruction, multiple data (SIMD) architecture including one or more processing units configured to perform one or more operations (e.g., multiplication, addition, multiply-accumulate, etc.) based on instructions received from global manager 4022. To perform an operation on the communicated data packets, cores 4024 can include one or more processing elements for processing information in the data packets. Each processing element may comprise any number of processing units. In some embodiments, core 4024 can be considered a tile or the like.

Memory controller 406 can manage the reading and writing of data to and from a specific memory block within global memory 416 having on-chip memory blocks (e.g., 4 blocks of 8 GB second generation of high bandwidth memory (HBM2)) to serve as main memory. For example, memory controller 406 can manage read/write data coming from outside chip communication system 402 (e.g., from DMA unit 408 or a DMA unit corresponding with another NPU) or from inside chip communication system 402 (e.g., from a local memory in core 4024 via a 2D mesh controlled by a task manager of global manager 4022). Moreover, while one memory controller is shown in FIG. 4, it is appreciated that more than one memory controller can be provided in architecture 400. For example, there can be one memory controller for each memory block (e.g., HBM2) within global memory 416.

Memory controller 406 can generate memory addresses and initiate memory read or write cycles. Memory controller 406 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

DMA unit 408 can assist with transferring data between host memory 404 and global memory 416. In addition, DMA unit 408 can assist with transferring data between multiple NPUs (e.g., NPUs implementing instances of chip communication system 402). DMA unit 408 can allow off-chip devices to access both on-chip and off-chip memory without causing a CPU interrupt. Thus, DMA unit 408 can also generate memory addresses and initiate memory read or write cycles. DMA unit 408 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that architecture 400 can include a second DMA unit, which can be used to transfer data between other neural network processing architectures to allow multiple neural network processing architectures to communication directly without involving the host CPU.

JTAG/TAP controller 410 can specify a dedicated debug port implementing a serial communications interface (e.g., a JTAG interface) for low-overhead access to the NPU without requiring direct external access to the system address and data buses. JTAG/TAP controller 410 can also have on-chip test access interface (e.g., a TAP interface) that implements a protocol to access a set of test registers that present chip logic levels and device capabilities of various parts.

Peripheral interface 412 (such as a PCIe interface), if present, can serve as an inter-chip bus, enabling communication between architecture 400 and a host system, or between architecture 400 and other devices. For example, in some embodiments, architecture 400 can be configured as a PCIe device of the host system. Other peripherals may then connect into the PCIe interface of the host system. The host system may then orchestrate communications between architecture 400 and the other peripherals. Interface 414 can enable communication between instances of chip communication system 402 in a system. Interface 414 can include on-chip communication modules or ports.

In some embodiments, architecture 400 can further include a host system, which can include host memory 404 and host unit 420. Host memory 404 can be off-chip memory such as a host CPU's memory. For example, host memory 404 can be a DDR memory (e.g., DDR SDRAM) or the like. Host memory 404 can be configured to store a large amount of data with slower access speed, compared to the on-chip memory integrated within one or more processors, acting as a higher-level cache. Host unit 420 can be one or more processing unit (e.g., an X86 central processing unit). In some embodiments, a host system having host unit 420 and host memory 404 can comprise a compiler (not shown). The compiler is a program or computer software that transforms computer codes written in one programming language into NPU instructions to create an executable program. In machine learning applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler that generates the instructions for the parallel processing can be on the host system, which pushes commands to chip communication system 402. Based on these commands, each task manager can assign any number of tasks to one or more cores (e.g., core 4024). Some of the commands can instruct DMA unit 408 to load the instructions (generated by the compiler) and data from host memory 404 into global memory 416. The loaded instructions can then be distributed to each core assigned with the corresponding task, and the one or more cores can process these instructions.

FIG. 5 illustrates a schematic diagram of an exemplary cloud system 530 incorporating architecture 400 and suitable for implementing the convolutional neural network of FIGS. 1-3, according to embodiments of the disclosure. As shown in FIG. 5, cloud system 530 can provide cloud service with artificial intelligence (AI) capabilities, and can include a plurality of computing servers (e.g., 532 and 534). In some embodiments, a computing server 532 can, for example, incorporate parallel computing architecture 400 of FIG. 4. As depicted in FIG. 5, server 532 can include instances of chip communication system 402 and host unit 420. Host unit 420 can communicate (e.g., using peripheral interface 412) with the instances of chip communication system 402 over a bus 536 (e.g., a PCIe bus). Instances of chip communication system 402 are shown in FIG. 5 in a simplified manner for simplicity and clarity. With the assistance of architecture 400, cloud system 530 can provide extended AI capabilities including image recognition, facial recognition, translations, 3D modeling, and the like.

It is appreciated that architecture 400 can be deployed to computing devices in other forms. For example, architecture 400 can also be integrated in a computing device, such as a smart phone, a tablet, and a wearable device. Moreover, while a parallel computing architecture is shown in FIGS. 4-5, it is appreciated that any the disclosed embodiments are not limited to this particular architecture.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The embodiments may further be described using the following clauses:

1. A processing unit comprising: one or more cores configured by a task manager to generate a neural network output from a neural network input, generation of the neural network output comprising: generating an output feature map comprising a first output channel and a second output channel using an input feature map comprising a first input channel and a second input channel, generation of the output feature map comprising: generating, by up-sampling the first input channel, a third input channel; generating, by down-sampling the second input channel, a fourth input channel; convolving a first input including the third input channel and the second input channel with a first kernel to generate the first output channel; and convolving a second input including the fourth input channel and the first input channel with a second kernel to generate the second output channel.

2. The processing unit of clause 1, wherein: generation of the neural network output further comprises: obtaining an initial feature map; generating, by down-sampling the initial feature map, a down-sampled initial feature map; convolving the initial feature map by a third kernel to generate a second channel group comprising the second input channel; and convolving the down-sampled initial feature map by a fourth kernel to generate a first channel group comprising the first input channel.

3. The processing unit of clause 1 or 2, wherein the down-sampling comprises at least one of convolution, sampling, max pooling, or averaging pooling.

4. The processing unit of any one of clauses 1 to 3, wherein: generation of the output feature map further comprises combining the first output channel and the second output channel to generate the output feature map.

5. The processing unit of any one of clauses 1 to 4, wherein: the input feature map comprises groups of channels, each group of channels including multiple channels having a predetermined size, the predetermined sizes differing between the groups.

6. The processing unit of clause 5, wherein: the input feature map comprises 2, 4, 8, 16, or 32 groups of channels.

7. The processing unit of clause 5 or 6, wherein: the predetermined sizes differ by powers of four or more.

8. A processing unit comprising: one or more cores configured by a task manager to generate a neural network output from a neural network input, generation of the neural network output comprising: generating an output feature map comprising a first output channel of a first size and a second output channel of a second size using an input feature map comprising a first input channel of the first size and a second input channel of the second size, the first size smaller than the second size, generation of the output feature map comprising: generating, using the first input channel, a third input channel of the second size; generating, using the second input channel, a fourth input channel of the first size; generating the first output channel by providing a first input including the third input channel and the second input channel to a first convolutional sub-layer; and generating the second output channel by providing a second input including the first input channel and the fourth input channel to a second convolutional sub-layer.

9. The processing unit of clause 8, wherein: generation of the neural network output further comprises: repeatedly generating first inputs and second inputs for provision to the first convolutional sub-layer and the second convolutional sub-layer using output feature maps generated using the first convolutional sub-layer and the second convolutional sub-layer.

10. The processing unit of clause 8 or 9, wherein: the third input channel is generated by up-sampling the first input channel; and the fourth input channel is generated by down-sampling the second input channel.

11. The processing unit of clause 10, wherein the up-sampling comprises at least one of deconvolution, unpooling, or interpolation.

12. The processing unit of any one of clauses 8 to 11, wherein: the input feature map comprises groups of channels, each group of channels including one or more channels having a predetermined size, the predetermined sizes differing between the groups.

13. The processing unit of clause 12, wherein: the input feature map comprises 2, 4, 8, 16, or 32 groups of channels.

14. The processing unit of clause 12 or 13, wherein: the predetermined sizes differ by powers of four or more.

15. A non-transitory computer-readable medium storing a set of instructions that are executable by one or more processors of a system to cause the system to perform operations comprising: obtaining an input feature map comprising groups of channels, each group of channels including one or more channels having a predetermined size, the predetermined sizes differing between the groups; and generating, for each one of the groups of channels, an output channel, generation comprising: resizing the channels in the remaining groups of channels to match the predetermined size of the each one of the groups of channels; and combining the channels in the each one of the groups with the resized channels; applying the combined channels to a convolutional sub-layer to generate the output channel.

16. The computer-readable medium of clause 15, wherein the input feature map comprises between 2 and 32 groups of channels.

17. The computer-readable medium of clause 15 or 16, wherein: the predetermined sizes differ by powers of four or more.

18. The computer-readable medium of any one of clauses 15 to 17, wherein the operations further comprise: obtaining an initial feature map; generating input maps for each of the predetermined sizes using the initial feature map; applying the input maps to a convolutional sub-layer to generate output maps; and combining the output maps to generate the input feature map.

19. The computer-readable medium of any one of clauses 15 to 18, wherein the resizing comprises at least one of convolution, max pooling, averaging pooling, deconvolution, unpooling, or interpolation.

20. The computer-readable medium of any one of clauses 15 to 19, wherein the operations further comprise: generating an output feature map by concatenating the output channels.

21. A method for generating output channels using a convolutional layer of a convolutional neural network, comprising: obtaining an input feature map comprising groups of channels, each group of channels including one or more channels having a predetermined size, the predetermined sizes differing between the groups; and generating, for each one of the groups of channels, an output channel, generation comprising: resizing the channels in the remaining groups of channels to match the predetermined size of the each one of the groups of channels; combining the channels in the each one of the groups with the resized channels; applying the combined channels to a convolutional sub-layer to generate the output channel.

22. The method of clause 21, wherein the input feature map comprises between 2 and 32 groups of channels.

23. The method of clause 21 or 22, wherein: the predetermined sizes differ by powers of four or more.

24. The method of any one of clauses 21 to 23, further comprising: obtaining an initial feature map; generating input maps for each of the predetermined sizes using the initial feature map; applying the input maps to a convolutional sub-layer to generate output maps; and combining the output maps to generate the input feature map.

25. The method of any one of clauses 21 to 24, wherein the resizing comprises at least one of convolution, max pooling, averaging pooling, deconvolution, unpooling, or interpolation.

26. The method of any one of clauses 21 to 25, further comprising: generating an output feature map by concatenating the output channels.

27. A method for generating an output feature map including a first output channel and a second output channel from an input feature map comprising a first input channel and a second input channel, using a convolutional layer of a convolutional neural network, the method comprising: generating, by up-sampling the first input channel, a third input channel; generating, by down-sampling the second input channel, a fourth input channel; convolving a first input including the third input channel and the second input channel with a first kernel to generate the first output channel; and convolving a second input including the fourth input channel and the first input channel with a second kernel to generate the second output channel.

28. The method of clause 27, further comprising: obtaining an initial feature map; generating, by down-sampling the initial feature map, a down-sampled initial feature map; convolving the initial feature map by a third kernel to generate a second channel group comprising the second input channel; and convolving the down-sampled initial feature map by a fourth kernel to generate a first channel group comprising the first input channel.

29. The method of clause 27 or 28, wherein the down-sampling comprises at least one of convolution, sampling, max pooling, or averaging pooling.

30. The method of any one of clauses 27 to 29, wherein: generation of the output feature map further comprises combining the first output channel and the second output channel to generate the output feature map.

31. The method of any one of clauses 27 to 30, wherein: the first input feature map comprises groups of channels, each group of channels including multiple channels having a predetermined size, the predetermined sizes differing between the groups.

32. The method of clause 31, wherein: the first input feature map comprises 2, 4, 8, 16, or 32 groups of channels.

33. The method of clause 31 or 32, wherein: the predetermined sizes differ by powers of four or more.

34. A method for generating an output feature map including a first output channel of a first size and a second output channel of a second size from an input feature map including a first input channel of the first size and a second input channel of the second size, the first size smaller than the second size, using a convolutional layer of a convolutional neural network, the method comprising: generating, using the first input channel, a third input channel of the second size; generating, using the second input channel, a fourth input channel of the first size; generating the first output channel by providing a first input including the third input channel and the second input channel to a first convolutional sub-layer; and generating the second output channel by providing a second input including the first input channel and the fourth input channel to a second convolutional sub-layer.

35. The method of clause 34, wherein: generation of the neural network output further comprises: repeatedly generating first inputs and second inputs for provision to the first convolutional sub-layer and the second convolutional sub-layer using output feature maps generated using the first convolutional sub-layer and the second convolutional sub-layer.

36. The method of clause 34 or 35, wherein: the third input channel is generated by up-sampling the first input channel; and the fourth input channel is generated by down-sampling the second input channel.

37. The method of clause 36, wherein the up-sampling comprises at least one of deconvolution, unpooling, or interpolation.

38. The method of any one of clauses 34 to 37, wherein: the first input feature map comprises groups of channels, each group of channels including one or more channels having a predetermined size, the predetermined sizes differing between the groups.

39. The method of clause 38, wherein: the first input feature map comprises 2, 4, 8, 16, or 32 groups of channels.

40. The method of clause 38 or 39, wherein: the predetermined sizes differ by powers of four or more.

41. A device comprising: a host unit; and a neural processing unit configurable by the host unit to: generate a neural network output from a neural network input using one or more cores of the neural processing unit, generation of the neural network output comprising: generating an output feature map comprising a first output channel and a second output channel using an input feature map comprising a first input channel and a second input channel, generation of the output feature map comprising: generating, by up-sampling the first input channel, a third input channel; generating, by down-sampling the second input channel, a fourth input channel; convolving a first input including the third input channel and the second input channel with a first kernel to generate the first output channel; and convolving a second input including the fourth input channel and the first input channel with a second kernel to generate the second output channel.

42. The device of clause 41, wherein: generation of the neural network output further comprises: obtaining an initial feature map; generating, by down-sampling the initial feature map, a down-sampled initial feature map; convolving the initial feature map by a third kernel to generate a second channel group comprising the second input channel; and convolving the down-sampled initial feature map by a fourth kernel to generate a first channel group comprising the first input channel.

43. The device of clause 41 or 42, wherein the down-sampling comprises at least one of convolution, sampling, max pooling, or averaging pooling.

44. The device of any one of clauses 41 to 43, wherein: generation of the output feature map further comprises combining the first output channel and the second output channel to generate the output feature map.

45. The device of any one of clauses 41 to 44, wherein: the input feature map comprises groups of channels, each group of channels including multiple channels having a predetermined size, the predetermined sizes differing between the groups.

46. The device of clause 45, wherein: the input feature map comprises 2, 4, 8, 16, or 32 groups of channels.

47. The device of clause 45 or 46, wherein: the predetermined sizes differ by powers of four or more.

48. A device comprising: a host unit; and a neural processing unit configurable by the host unit to generate a neural network output from a neural network input, generation of the neural network output comprising: generating an output feature map comprising a first output channel of a first size and a second output channel of a second size using an input feature map comprising a first input channel of the first size and a second input channel of the second size, the first size smaller than the second size, generation of the output feature map comprising: generating, using the first input channel, a third input channel of the second size; generating, using the second input channel, a fourth input channel of the first size; generating the first output channel by providing a first input including the third input channel and the second input channel to a first convolutional sub-layer; and generating the second output channel by providing a second input including the first input channel and the fourth input channel to a second convolutional sub-layer.

49. The device of clause 48, wherein: generation of the neural network output further comprises: repeatedly generating first inputs and second inputs for provision to the first convolutional sub-layer and the second convolutional sub-layer using output feature maps generated using the first convolutional sub-layer and the second convolutional sub-layer.

50. The device of clause 48 or 49, wherein: the third input channel is generated by up-sampling the first input channel; and the fourth input channel is generated by down-sampling the second input channel.

51. The device of clause 50, wherein the up-sampling comprises at least one of deconvolution, unpooling, or interpolation.

52. The device of any one of clauses 48 to 51, wherein: the input feature map comprises groups of channels, each group of channels including one or more channels having a predetermined size, the predetermined sizes differing between the groups.

53. The device of clause 52, wherein: the input feature map comprises 2, 4, 8, 16, or 32 groups of channels.

54. The device of clause 52 or 53, wherein: the predetermined sizes differ by powers of four or more.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A processing unit comprising:
a task manager; and
one or more cores configured by the task manager to generate a neural network output from a neural network input, generation of the neural network output comprising:
    generate an output feature map comprising a first output channel and a second output channel using an input feature map comprising a first input channel and a second input channel, generation of the output feature map comprising:

generate, by up-sampling the first input channel, a third input channel having a size of the second input channel;
generate, by down-sampling the second input channel, a fourth input channel having a size of the first input channel;
convolve a first input including the third input channel and the second input channel with a first kernel to generate the first output channel; and
convolve a second input including the fourth input channel and the first input channel with a second kernel to generate the second output channel.

2. The processing unit of claim 1, wherein:
generation of the neural network output further comprises:
obtain an initial feature map;
generate, by down-sampling the initial feature map, a down-sampled initial feature map;
convolve the initial feature map by a third kernel to generate a second channel group comprising the second input channel; and
convolve the down-sampled initial feature map by a fourth kernel to generate a first channel group comprising the first input channel.

3. The processing unit of claim 1, wherein the down-sampling comprises at least one of convolution, sampling, max pooling, or averaging pooling.

4. The processing unit of claim 1, wherein:
generation of the output feature map further comprises combining of the first output channel and the second output channel to generate the output feature map.

5. The processing unit of claim 1, wherein:
the input feature map comprises groups of channels, each group of channels including multiple channels having a predetermined size, the predetermined sizes differing between the groups.

6. The processing unit of claim 5, wherein:
the input feature map comprises 2, 4, 8, 16, or 32 groups of channels.

7. The processing unit of claim 5, wherein:
the predetermined sizes differ by powers of four or more.

8. A method for generating an output feature map including a first output channel and a second output channel from an input feature map comprising a first input channel and a second input channel, using a convolutional layer of a convolutional neural network, the method comprising:
generating, by up-sampling the first input channel, a third input channel having a size of the second input channel;
generating, by down-sampling the second input channel, a fourth input channel having a size of the first input channel;
convolving a first input including the third input channel and the second input channel with a first kernel to generate the first output channel; and
convolving a second input including the fourth input channel and the first input channel with a second kernel to generate the second output channel.

9. The method of claim 8, further comprising:
obtaining an initial feature map;
generating, by down-sampling the initial feature map, a down-sampled initial feature map;
convolving the initial feature map by a third kernel to generate a second channel group comprising the second input channel; and
convolving the down-sampled initial feature map by a fourth kernel to generate a first channel group comprising the first input channel.

10. The method of claim 8, wherein the down-sampling comprises at least one of convolution, sampling, max pooling, or averaging pooling.

11. The method of claim 8, wherein:
generation of the output feature map further comprises combining the first output channel and the second output channel to generate the output feature map.

12. The method of claim 8, wherein:
the first input feature map comprises groups of channels, each group of channels including multiple channels having a predetermined size, the predetermined sizes differing between the groups.

13. The method of claim 12, wherein:
the first input feature map comprises 2, 4, 8, 16, or 32 groups of channels.

14. The method of claim 12, wherein:
the predetermined sizes differ by powers of four or more.

15. A device comprising:
a host unit; and
a processing unit configurable by the host unit to:
generate a neural network output from a neural network input using one or more cores of the neural processing unit, generation of the neural network output comprising:
generate an output feature map comprising a first output channel and a second output channel using an input feature map comprising a first input channel and a second input channel, generation of the output feature map comprising:
generate, by up-sampling the first input channel, a third input channel having a size of the second input channel;
generate, by down-sampling the second input channel, a fourth input channel having a size of the first input channel;
convolve a first input including the third input channel and the second input channel with a first kernel to generate the first output channel; and
convolve a second input including the fourth input channel and the first input channel with a second kernel to generate the second output channel.

16. The device of claim 15, wherein:
generation of the neural network output further comprises:
obtain an initial feature map;
generate, by down-sampling the initial feature map, a down-sampled initial feature map;
convolve the initial feature map by a third kernel to generate a second channel group comprising the second input channel; and
convolve the down-sampled initial feature map by a fourth kernel to generate a first channel group comprising the first input channel.

17. The device of claim 15, wherein the down-sampling comprises at least one of convolution, sampling, max pooling, or averaging pooling.

18. The device of claim 15, wherein:
generation of the output feature map further comprises combining of the first output channel and the second output channel to generate the output feature map.

19. The device of claim 15, wherein:
the input feature map comprises groups of channels, each group of channels including multiple channels having a predetermined size, the predetermined sizes differing between the groups.

20. The device of claim 19, wherein:
the input feature map comprises 2, 4, 8, 16, or 32 groups of channels.

21. The device of claim 19, wherein:
the predetermined sizes differ by powers of four or more.

\* \* \* \* \*